(12) United States Patent
Davies et al.

(10) Patent No.: US 8,235,828 B2
(45) Date of Patent: Aug. 7, 2012

(54) DIAPHRAGM COUPLINGS

(75) Inventors: Jonathan Paul Davies, Great Bridgeford (GB); Tony Wilson, Wolverhampton (GB)

(73) Assignee: Moog Wolverhampton Limited, Wolverhampton (GB)

( * ) Notice: Subject to any disclaimer, the term of this patent is extended or adjusted under 35 U.S.C. 154(b) by 298 days.

(21) Appl. No.: 12/528,045

(22) PCT Filed: Feb. 6, 2008

(86) PCT No.: PCT/GB2008/000414
§ 371 (c)(1),
(2), (4) Date: Oct. 30, 2009

(87) PCT Pub. No.: WO2008/102101
PCT Pub. Date: Aug. 28, 2008

(65) Prior Publication Data
US 2010/0093449 A1 Apr. 15, 2010

(30) Foreign Application Priority Data
Feb. 21, 2007 (GB) .................. 0703280.8

(51) Int. Cl.
*F16D 3/79* (2006.01)

(52) U.S. Cl. .......................... 464/79; 464/99

(58) Field of Classification Search .................. 464/79, 464/80, 98, 99; 267/161, 162
See application file for complete search history.

(56) References Cited

U.S. PATENT DOCUMENTS

| 2,550,580 | A | | 4/1951 | McLeod et al. |
| 2,632,621 | A | * | 3/1953 | Gamble ............... 267/162 X |
| 2,967,739 | A | * | 1/1961 | Hoffmann ............ 267/162 X |
| 4,265,099 | A | * | 5/1981 | Johnson et al. ............... 464/99 |
| 5,158,504 | A | * | 10/1992 | Stocco ............... 464/99 |
| 5,364,309 | A | | 11/1994 | Heidrich et al. |
| 6,077,165 | A | | 6/2000 | Jewell |

FOREIGN PATENT DOCUMENTS

| EP | 397314 A | | 11/1990 | |
| EP | 627571 A | | 12/1994 | |
| EP | 837542 A | | 9/2007 | |
| GB | 11704 A | | 0/1906 | |
| SU | 195793 | * | 5/1967 | ............ 464/80 |
| WO | WO 92/12356 A1 | * | 7/1992 | ............ 464/99 |

* cited by examiner

*Primary Examiner* — Gregory Binda
(74) *Attorney, Agent, or Firm* — Hodgson Russ LLP

(57) ABSTRACT

A diaphragm coupling having first and second diaphragm plates that are joined together around their outer edges. Each diaphragm plate has a central, axially-extending hub. The hub of the first plate supports within it a pin member having an outwardly projecting shoulder at each end adapted to engage an internal shoulder on the hub of the first plate at one end and an internal shoulder on the hub of the second plate at the other end so as to limit axial separation of the two hubs—from one another.

7 Claims, 3 Drawing Sheets

DIAPHRAGM COUPLINGS

CROSS-REFERENCE TO RELATED APPLICATIONS

This is a national stage application under 35 U.S.C. §371 (c) of prior-filed, co-pending PCT patent application serial number GB08/000414, filed on Feb. 6, 2008, which claims priority to British patent application serial number 0703280.8 filed on Feb. 21, 2007, each of which is hereby incorporated by reference in its entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention relates to diaphragm couplings.

2. Description of Related Art

Diaphragm couplings are used to provide a constant velocity joint between two rotating members that allows for a small amount of angular displacement between the members. The couplings comprise two parallel, flexible plates joined together around their outer edges and joined to the respective rotating members at central mountings. Alternatively, the plates could be joined together centrally and coupled to the rotating members at their outer edges. When there is an angular displacement between the two rotating members the two plates flex to accommodate this. These couplings have various advantages in that they have no moving parts and require little or no maintenance. Examples of diaphragm couplings are described in U.S. Pat. Nos. 4,133,188, 3,959,988, 4,802,882, 6,394,387, 4,191,030, 4,411,634, EP0627571, U.S. Pat. Nos. 6,183,317, 6,050,865, 5,755,622 and U.S. 5,407,386.

Diaphragm couplings do, however, have various disadvantages. Couplings capable of handling high loads and operating in adverse environmental conditions tend to be relatively complex, heavy and expensive.

It is an object of the present invention to provide an alternative diaphragm coupling.

BRIEF SUMMARY OF THE INVENTION

According to one aspect of the present invention there is provided a diaphragm coupling having first and second diaphragm plates joined together around their outer edges, each diaphragm plate having a central, axially-extending hub, the hub of the first plate supporting within it a pin member having an outwardly projecting shoulder at each end adapted to engage an internal shoulder on the hub of the first plate at one end and an internal shoulder on the hub of the second plate at the other end so as to limit axial separation of the two hubs from one another.

The hub on one plate preferably extends within the hub of the other plate to define therebetween an annular gap that permits angular displacement between the two hubs up to a predetermined angle and prevents angular displacement in excess of the predetermined angle. One end of the pin member is preferably swaged outwardly against the internal shoulder on the hub of the first plate.

According to a second aspect of the present invention there is provided a diaphragm plate for a diaphragm coupling, the plate having a central hub member and an outer edge adapted to be joined with another diaphragm plate, the diaphragm plate tapering in thickness from the hub member to the outer edge and being thinner at the outer edge, at least one side of the plate having a profile that is curved in a first region adjacent the hub member with a first radius of curvature and is curved in a second region adjacent the first region with a second radius of curvature larger than the first.

Preferably both sides of the plate have a substantially similar profile.

According to a further aspect of the present invention there is provided a diaphragm coupling including at least one diaphragm plate according to the above second aspect of the present invention.

BRIEF DESCRIPTION OF THE SEVERAL VIEWS OF THE DRAWINGS

A diaphragm coupling according to the present invention will now be described, by way of example, with reference to the accompanying drawings, in which.

DETAILED DESCRIPTION OF THE INVENTION

Figure 1:
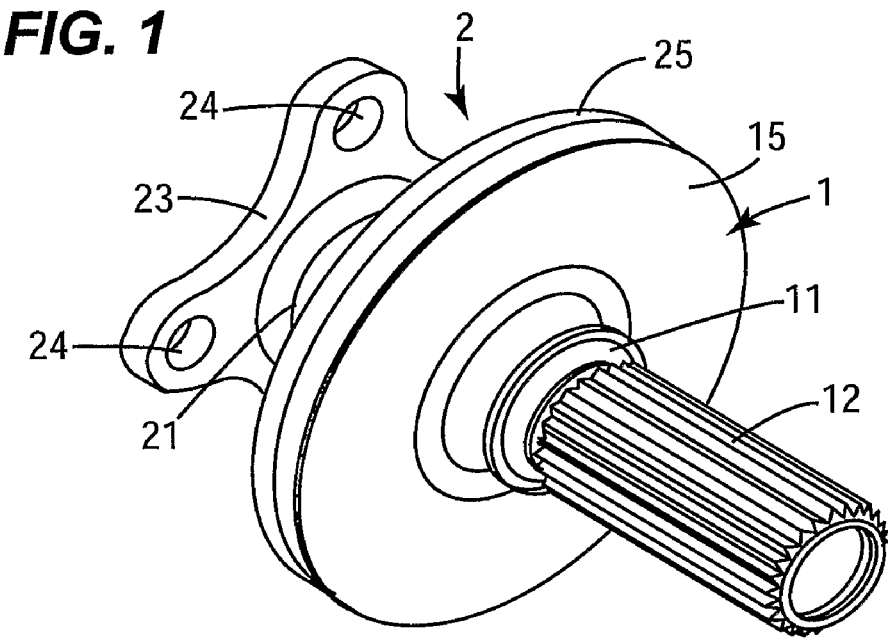
FIG. 1 is a perspective view of the coupling.
Figure 2:
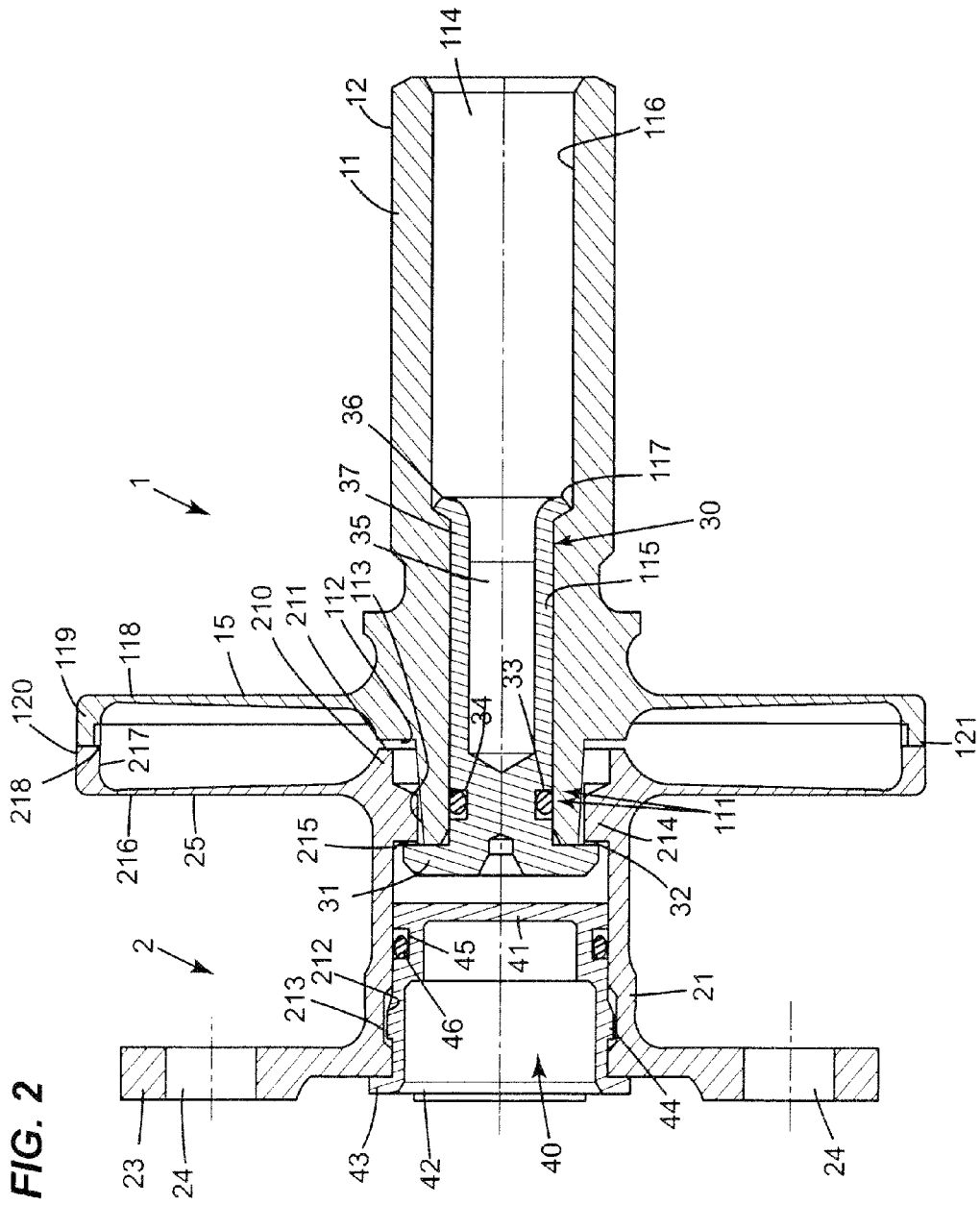
FIG. 2 is a cross-sectional side elevation view of the coupling.

With reference first to FIGS. 1 and 2, the coupling comprises two diaphragm plate components 1 and 2 having central hub members 11 and 21 respectively. The hub member 11 on the right-hand component 1 is generally cylindrical and provided with externally-splined portion 12. The hub member 21 on the other component 2 has a cylindrical portion 22 extending axially and terminated by a laterally-extending mounting flange 23 having four mounting holes 24 at its corners. Each component 1 and 2 also includes an integral diaphragm plate 15 and 25 respectively extending radially outwardly of the respective hub 11 and 21 and joined together around their outer edges. In use, the splined portion 12 is inserted in a drive input of a gear or the like (not shown) and the flange 23 is bolted to a similar flange (not shown) at one end of a torque tube or other rotatable drive member. In this way, drive from the torque tube is transmitted via the diaphragm coupling to the gear or other driven member. The diaphragm coupling is arranged to permit limited relative angular displacement between the rotatable members coupled with opposite ends of the coupling.

Both diaphragm plate components 1 and 2 are machined from stainless steel (15-5PH H1025 per AMS 5659-Type 1 (Var)). As can be seen in FIG. 2, the hub 21 of the left-hand component 2 is cylindrical and hollow and extends axially to the left relative to the diaphragm plate 25 apart from a short cylindrical collar 210. The collar 210 projects to the right of the diaphragm plate 25 and provides a flat, annular, laterally-extending contact end surface 211. Internally, the hub 21 has a shallow annular recess 212 close to its left-hand end defining a right-facing annular shoulder 213. Towards its right-hand end and just to the left of the diaphragm plate 25, the hub 21 has an internally-projecting annular step 214 defining a left-facing shoulder 215. The diaphragm plate 25 projects radially outwardly at right angles relative to the hub 21 and tapers to a reduced thickness at its outer edge 216. Its configuration is the same as the diaphragm plate 15 on the right-hand component 1. At its outer edge 216, the diaphragm plate 25 is formed with a peripheral wall 217, which extends axially to the right and has a stepped edge 218.

Figure 3:
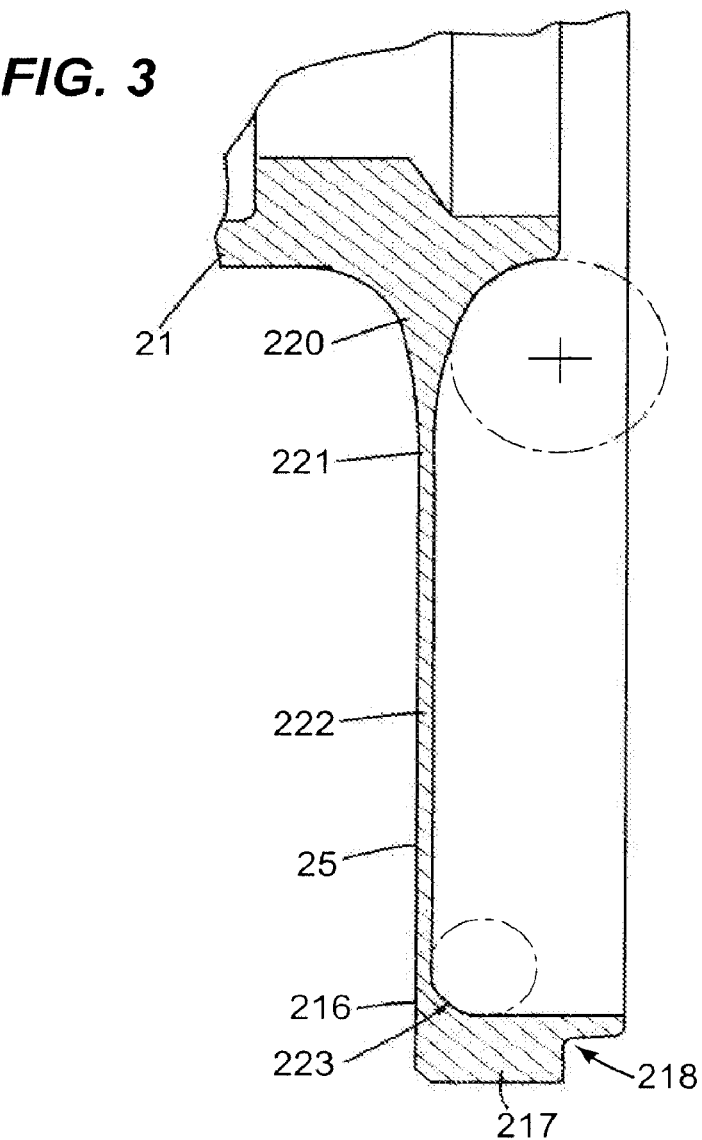
FIG. 3 is a cross-sectional side elevation view of a part of a diaphragm plate of the coupling to an enlarged scale.

The shape of the left-hand diaphragm plate 25 will now be described with reference to FIG. 3, which shows the profile of the plate in detail. The plate 25 is made up of four different regions. The first region 220 adjacent the hub 21 is curved on both sides with a relatively small radius of curvature of about 3 mm. This curved region 220 forms a smooth, stepless blend transition with the hub 21. The second region 221 continues on both sides of the plate 25 as a smooth, stepless transition from the first region 220 and is likewise curved but with a considerably greater radius of curvature of about 25 mm. The third region 222 continues on both sides of the plate 25 as a smooth, stepless transition from the second region 221 and is flat and tapering so that there is a progressive reduction in thickness from the first region 220 to the outer end of the third region 222. The fourth region 223 is a short region that is curved with a radius of curvature of about 1.6 mm on the inner, right-hand side only, that is the side from which the peripheral wall 217 projects. The opposite, outer side of the plate 25 is flat over the fourth region 223 to the outer edge of the plate. The thickness of the diaphragm plate 25 is selected to permit some flexing whilst ensuring maximum torque transmission. The other plate 15 is shaped in the same manner. Different diaphragm plates could have different surface profiles on one or both surfaces.

Figure 4:
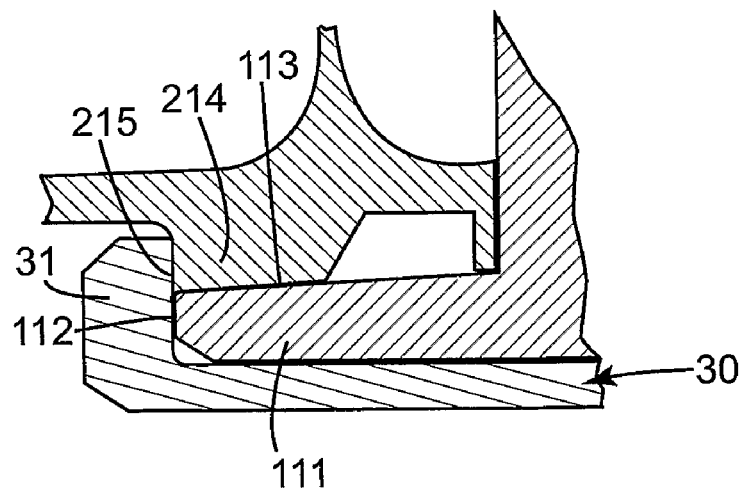
FIG. 4 is a cross-sectional side elevation view of a part of the coupling at a limit of angular displacement.

The hub 11 of the right-hand component 1 is cylindrical, hollow and extends mainly to the right of its diaphragm plate 15 to provide the splined portion 12. The hub 11 also has a portion 111 projecting to the left of the diaphragm plate 15. The projecting portion 111 is reduced in external diameter, forming an annular, left-facing lateral contact surface 112. The projecting portion 111 provides an angular limit stop in cooperation with the passage through the step 214 in the left-hand component 2. In particular, the external surface 113 of the stop portion 111 is tapered at an angle of 3° such that its external diameter is less at its left-hand end. The stop portion 111 is a relatively close fit within the right-hand end of the step 214, the taper on the stop portion ensuring that the clearance at the opposite end is slightly greater. This enables angular displacement of the two hubs 11 and 21 relative to one another, limited in extent by contact of the external surface 113 of the stop portion 111 against the internal surface of the step 214, as shown in FIG. 4, where the right-hand end of the right-hand component is angled down slightly. Internally, the hub 11 has a bore 114 extending along its length and divided into a left-hand region 115 and a larger diameter right-hand region 116 by a right-facing shoulder 117. The diaphragm plate 15 projects radially outwardly at right angles relative to the hub 11 and tapers to a reduced thickness at its outer edge 118. At its outer edge 118, the plate 15 is formed with a peripheral wall 119, which extends axially to the right and has a stepped edge 120 shaped to fit with the stepped edge 218 on the other plate 25. The mating edges 120 and 218 are joined and sealed with one another by welding, preferably by an electron beam weld 121.

Both the inside and outside surfaces of both diaphragm plates 15 and 25 are treated to produce a thin surface layer of compressive residual stress before being welded together. This is achieved by exposing the surfaces to a media blast in a controlled manner. Preferably this is achieved by using dry glass beads in an abrasive blasting machine at a controlled pressure. This treatment has been found to help give the diaphragm plates 15 and 25 the desired mechanical strength. Where different diaphragm materials are used it may not be necessary to treat the diaphragms in this way.

Figure 5:
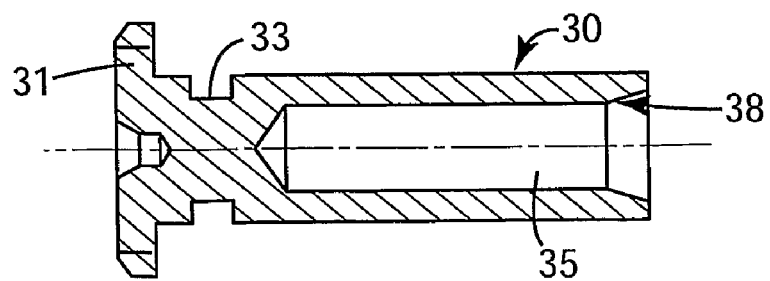
FIG. 5 is a cross-sectional side elevation view of the pin member of the coupling before assembly.

It can be seen from FIG. 2 that the diaphragm coupling comprises a further two components, namely a stop pin 30 and a sealing plug 40. The stop pin 30 is also shown, before assembly, in FIG. 5. The pin 30 is machined of stainless steel and is generally cylindrical with a circular cross section and an external diameter that is a close sliding fit within the left-hand region 115 of the bore 114 through the hub 11. At the left-hand end of the pin 30, a flange 31 projects radially outwardly. The external diameter of the flange 31 is greater than both the external diameter of the stop portion 111 on the right-hand hub 11 and the internal diameter of the step 214 on the left-hand hub 21 so that the flange projects across the shoulder 215. In normal operation, there is arranged to be a small gap 32 between the right-facing surface of the flange 31 and the shoulder 215. When an axial tension force is applied to the coupling, tending to pull the two hubs 11 and 21 away form one another, the gap 32 closes. By appropriately selecting the size of this gap 32, the axial separation between the two halves of the diaphragm coupling is limited. An annular channel 33 formed around the outside of the pin 30 just to the right of the flange 31 receives an O-ring seal 34, which makes a fluid tight seal between the outside of the pin 30 and the inside of the hub 11. The right-hand end of the stop pin 30 opens into an axial bore 35 within the pin, the bore being closed about two thirds of the way along the length of the pin.

Figure 6:
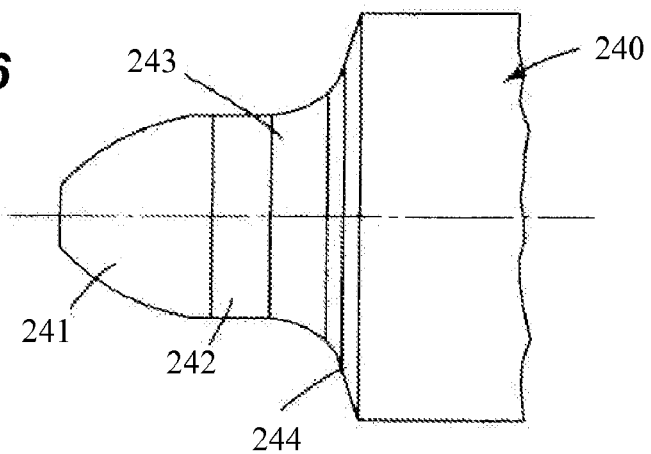
FIG. 6 is an enlarged side elevation view of a tool used in assembly of the pin member in the coupling.

When assembled in the hub 11, the flange 31 abuts the left hand end of the stop portion 111 on the hub. The right-hand end of the stop pin 30 is swaged outwardly to form a lip 36, which engages the right-facing shoulder 117 on the inside of the hub 11. The swaging is carried out not just to deform the lip 36 outwardly but also to cold work harden a short region 37 of the pin 30 adjacent the lip and located within the left-hand region 115 of the bore 114 through the hub 11. This is carried out using the swaging tool 240 shown in FIG. 6. The operative tip of the swaging tool 240 has a first region 241 with a convex curvature that tapers from a diameter less than that of the bore 35 in the pin 30 to a diameter that is about 0.5 mm larger than the bore. The adjacent, second region 242 is of cylindrical shape and constant diameter along its length until it meets a third region 243, which flares outwardly with a concave profile. The third region 243 adjoins a fourth region 244 of frusto-conical shape. It can be seen from FIG. 5 that the bore 35 in the stop pin 30 has a flared entrance 38 before assembly. The swaging and work hardening operation is carried out by inserting the tip of the tool 240 into the flared entrance 38 of the stop pin 30 when located in position in the hub 11. The rear end (not shown) of the tool 240 projects from the right-hand end of the hub 11. The projecting end of the tool 240 is urged by a single blow to force the operative tip further into the stop pin 30. As this happens, the rear end of the stop pin 30 is forced outwardly by engagement with the flared third region 243 of the tool 240 to form the lip 36. The region 37 is also compressed outwardly and work hardened. This has been found to be effective in reducing stress damage to the stop pin 30 when force is exerted on the lip 36. The stop pin 30 is, therefore, effectively retained in the hub 11 without the need for bolts or any additional components. This helps minimize complexity, weight, cost and size and does not require routine maintenance. The closed nature of the stop pin 30 and the external 0-ring seal 34 prevent ingress of material into the interior of the coupling via the right-hand component 1.

Material is prevented from entering the coupling from the opposite side by means of the sealing plug 40. The plug 40 is machined from stainless steel and has a generally cup shape with a closed end 41 and an opposite open end 42 having a shallow outwardly-projecting lip 43. Externally, the plug 40 has an inclined annular ramp 44 located to latch into the recess 212 in the hub 21 and engage behind the shoulder 213, thereby preventing removal. In this position, the lip 43 abuts the left-hand face of the flange 23. The plug 40 also has an annular recess 45 around its external surface close to its closed end 41 in which is received an O-ring seal 46 shaped to form a fluid-tight seal between the outside of the plug and the inside of the hub 21. Alternative materials could be used for the plug 40.

The diaphragm coupling is, therefore, protected against excessive angular displacement by contact of the stop portion 111 against the inside of the step 214. It is protected against excessive axial tension loads by contact of the flange 31 against the shoulder 215 on the step 214. It is also protected against excessive axial compression or punch loads in the opposite direction by contact of the end surface 211 on the collar 210 with the contact surface 112 on the right-hand hub 11. The diaphragm coupling is protected against these forces in a relatively simple manner, without the need for bolts or similar fixings, that can be provided at a low cost. The diaphragm coupling can be provided completely sealed as described to ensure that there is no ingress of foreign materials that could interfere with the various stop surfaces. In some applications, however, it may not be necessary to have a completely sealed unit.

What is claimed is:

1. A diaphragm coupling, comprising:
   first and second diaphragm plates joined together around their outer edges,
   each diaphragm plate having a central, axially-extending hub,
   the hub of the first diaphragm plate supporting within it a pin member having an outwardly projecting shoulder at each end adapted to engage an internal shoulder on the hub of the first diaphragm plate at one end and an internal shoulder on the hub of the second diaphragm plate at the other end so as to limit axial separation of the two hubs from one another,
   wherein the hub of one of the first diaphragm plate and the second diaphragm plate extends within the hub of the other of the first diaphragm plate and the second diaphragm plate to define therebetween an annular gap that permits angular displacement between the two hubs up to a predetermined angle and prevents angular displacement in excess of the predetermined angle.

2. The diaphragm coupling of claim 1, wherein one end of the pin member is swaged outwardly against the internal shoulder on the hub of the first diaphragm plate.

3. The diaphragm coupling of claim 1, wherein the pin member comprises a recess for providing an 0-ring seal.

4. The diaphragm coupling of claim 1, wherein an external surface of the hub on one of the first diaphragm plate and the second diaphragm plate is tapered to permit the angular displacement between the two hubs.

5. A diaphragm plate for a diaphragm coupling, the diaphragm plate comprising:
   a central hub member and an outer edge adapted to be joined with another diaphragm plate;
   the diaphragm plate tapering in thickness from the hub member to the outer edge and being thinner at the outer edge, and
   at least one side of the diaphragm plate having a profile that is curved in a first region adjacent the hub member with a first radius of curvature and is curved in a second region adjacent and adjoining the first region with a second radius of curvature larger than the first radius of curvature, wherein the first region and the second region are curved in the same direction.

6. The diaphragm plate of claim 5, wherein both sides of the diaphragm plate have a substantially similar profile.

7. A diaphragm coupling comprising:
   at least one diaphragm plate, wherein the at least one diaphragm plate comprises:
   a central hub member and an outer edge adapted to be joined with another diaphragm plate,
   the diaphragm plate tapering in thickness from the hub member to the outer edge and being thinner at the outer edge, and
   at least one side of the diaphragm plate having a profile that is curved in a first region adjacent the hub member with a first radius or curvature and is curved in a second region adjacent and adjoining the first region with a second radius of curvature larger than the first radius of curvature, wherein the first region and the second region are curved in the same direction.

* * * * *